United States Patent [19]

Krull et al.

[11] 4,298,362

[45] Nov. 3, 1981

[54] FILTER CLEANING DEVICE

[75] Inventors: Walther Krull; Alfred Bekaan; Wolf-Dieter Schiller, all of Lübeck, Fed. Rep. of Germany

[73] Assignee: Beth GmbH, Lübeck, Fed. Rep. of Germany

[21] Appl. No.: 141,146

[22] Filed: Apr. 17, 1980

[30] Foreign Application Priority Data

Apr. 17, 1979 [DE] Fed. Rep. of Germany ....... 2915958

[51] Int. Cl.$^3$ .......................................... B01D 46/04
[52] U.S. Cl. .................................................... 55/304
[58] Field of Search ................. 55/284, 299, 300, 304, 55/305; 210/388

[56] References Cited

U.S. PATENT DOCUMENTS

| 1,341,129 | 5/1920 | Hopkins | 55/304 |
| 1,628,601 | 5/1927 | Feind | 55/304 |
| 2,014,298 | 9/1935 | Schneible | 55/304 |
| 2,047,908 | 7/1936 | Newhouse et al. | 55/304 |
| 2,830,676 | 4/1958 | Schneider | 55/304 |
| 2,879,863 | 3/1959 | Snyder | 55/304 |
| 3,097,939 | 7/1963 | Schneider et al. | 55/304 |
| 3,971,343 | 7/1976 | Ulrich et al. | 55/300 |

FOREIGN PATENT DOCUMENTS

| 1298399 | 6/1969 | Fed. Rep. of Germany . | |
| 47-3956 | 3/1972 | Japan | 55/304 |
| 569617 | 5/1945 | United Kingdom | 55/284 |

Primary Examiner—David L. Lacey
Attorney, Agent, or Firm—Montague & Ross

[57] ABSTRACT

A device for the groupwise cleaning of filter tubes in a filter assembly in which the tubes are disposed in a plurality of parallel rows with each tube being connected to a rod forming a tube carrier and having a seat upon which a spring bears. The other end of each spring engages an arm of a rocker which acts upon two rows of tubes.

9 Claims, 5 Drawing Figures

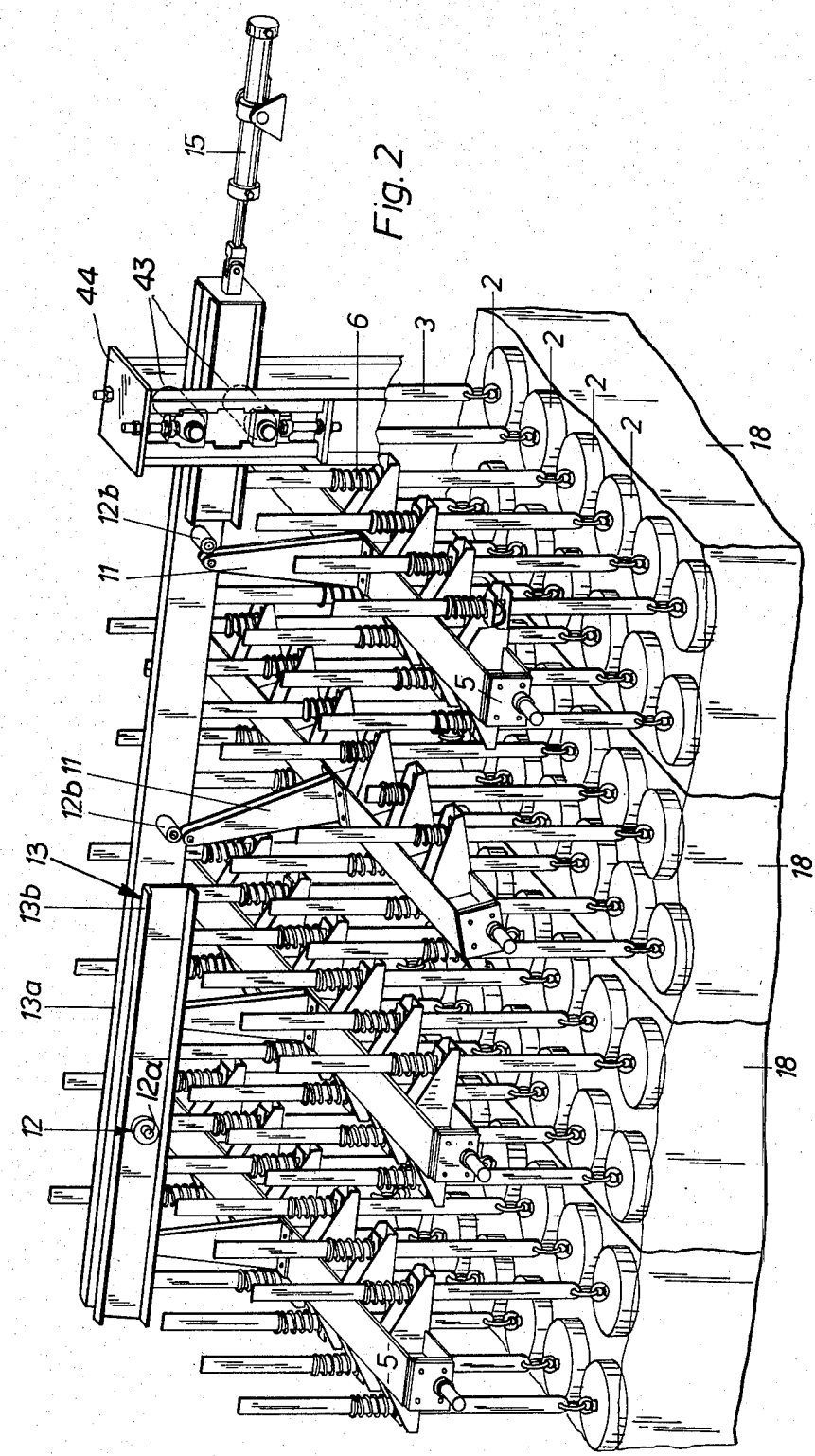

FILTER CLEANING DEVICE

FIELD OF THE INVENTION

Our present invention relates to a filter cleaning device and, more particularly, to a device for the groupwise cleaning of filter tubes or bags disposed in a plurality of rows in the filter housing. More specifically, the cleaning device of the invention is intended to facilitate the cleaning of the filter tubes which are suspended from respective filter holders and are arrayed in rows within the housing.

BACKGROUND OF THE INVENTION

In tube or bag filters for the removal of particulates from a gas, it is known to provide a filter housing in which the tubes of gas-permeable material are disposed in rows and are vertically oriented. It is also known, e.g. from German patent document—Printed Application—Auslegeschrift DE-AS No. 1,298,399, to provide the tube carriers as rods or bars which are mounted in holders or yokes which carry swingable actuating levers radially engaging around the tube carriers and having free ends connected to a bar which is shiftable for common actuation by an excentric or crank drive. The reciprocating movement of the bar can raise and lower the upper end of the tubes. The result is an expansion and contraction of the tube which derives from the pivotal movement of the holder and causes accumulated dust deposits on the filter material to be released. The dislodged dust falls through the filter space and can be collected in a bin or the like at the bottom of the housing from which the dust is removed by a worm. The worm can carry the dust through a discharge gate preventing the release of gas into the atmosphere.

With the conventional devices of the aforedescribed type, the expansion and contraction movements of the tubes of filter material are a result of the pivotal movement of outrigger-type arms caused by the excentric drive. To ensure a rapid expansion and contraction cycling, a correspondingly rapid movement of the excentric drive is required, i.e. the excentric shaft must be rotated at high speeds. This of course means that the shiftable bar and the connecting rod tied to the latter must also be operated at high speeds.

Experience has shown that the need to operate the bar, its drive and the connecting linkage at such high speeds requires massive construction with low tolerances to minimize wear and hence raises the cost of the filter. Furthermore, because of the friction and the masses which must be accelerated and decelerated for each cycle, the energy consumption is high and hence the filter is energy inefficient and expensive to operate.

It should be understood that, as one requires higher speeds for the mechanisms described, the forces which must be absorbed by the moving members and the guides or supports therefore are correspondingly increased.

As a consequence, the art has tended to resort to less positive methods of dislodging dust from filter surfaces, namely, the so-called rapping techniques, whereby the holders for the filter surface are periodically or intermittently impacted by a rapper.

In such systems, the holders for the filter tubes can extend through the roof of the filter housing and there provided with tilting-like formations cooperating with cam disks with sudden drops whereby the filter tubes are gradually expanded and, at the sudden drop, are spontaneously released. The lever can then be allowed to drop against the stop to provide the rapping action.

Rapping systems of this type, however, have similar disadvantages with respect to the high cost of the filter and, while rapid dislodging motions can be provided, the loading of the filter material is nevertheless high so that considerable stress is applied.

Perhaps more importantly is the environmental hazard created with filters of the latter type because of the amount of noise made by the rappers.

OBJECTS OF THE INVENTION

It is therefore the principal object of the present invention to provide an improved device for dislodging dust from a group of tube filters.

Another object of our invention is to provide a mechanism for expanding and contracting tube filters without the disadvantages of the earlier systems.

More specifically, it is an object of our invention to provide a device for the groupwise cleaning of filter tubes in a rapid, low-strain and relatively quiet manner.

SUMMARY OF THE INVENTION

These objects and others which will become apparent hereinafter are attained, in accordance with the present invention, in a device for dislodging dust from a group of filters disposed in two rows and having respective support members connected to the upper ends of the filter tubes, the mechanism comprising a linearly shiftable bar which engages a projection of a rocker formed with rows of arms engaging around the support rods of the respective filters of two rows and acting upon the latter through the intermediary of springs.

In other words with the system of the present invention, the support forks engage around the support rods and bear upon the latter through the intermediary of the coil springs or suspend the tubes from the rocker, the oscillating movement of the rocker being effected by momentary entrainment of the actuating projection or arm of the rocker by an abutment on a linearly shiftable bar, the abutment thereafter disengaging from the actuating arm as it passes the latter.

More generically, the invention comprises supporting each of the filter tubes on a damped elastic suspension having a natural frequency of vibration such that, as each rocker swings back and forth, the filter tubes are compressed and expanded by the rocker action and superimposed thereon is a vertical oscillation determined by the spring constant and the mass of the oscillating system as well as any viscous or fractional damping thereof.

In the case of a suspension involving a rod or bar, the spring may be a coil spring surrounding the rod or bar and bearing at one end against the fork or arm of the rocker. The spring can be a compression coil spring in which case it can be mounted between an adjustable stop on the bar above the rocker arm and the latter, or under tension, being anchored at opposite ends to the rod or bar.

Alternatively, the oscillatory suspension does not use a rigid bar but rather an element capable of elongation and condensation, such as a chain whose links can condense together or spread out, the spring surrounding this chain which then acts as a stop for the spring.

Thus, in the most general terms, the oscillatory suspension device of the invention comprises a tube carrier or support which is surrounded by a spring and which suspends the filter tube from a rocker arm or holder. Rocker arms are disposed symmetrically on opposite sides of the rocker bar, each connected by the oscillatory suspension to a respective tube so that when the rocker is at rest, the system is at equilibrium, i.e. the rocker arms and filters are disposed mirror symmetrically to opposite sides of a vertical median plane along the rocker axis.

When the rocker is engaged by the cam carried by the linearly shiftable bar mentioned previously, the rocker is swung in one sense sharply, thereby moving the arms on one side downwardly against the inertia of the filter tubes on this side and compressing or extending the respective springs. The arms on the opposite side are raised to extend or compress the respective springs while lifting the tops of the filter tubes.

The rocker, as the camming element passes, tends to swing back into equilibrium position, from which it is urged in the opposite sense by the camming element when the bar moves in the opposite direction to reverse the expansion or contraction of the filter elements and draw their tops upwardly or press them downwardly in a manner opposite the mode previously described. Thus the rocker itself is subjected to a damped angular oscillation about its axis. In addition, when the vibratory system formed by the springs and the mass suspended thereby is close to the resonance frequency, a vertical or linear oscillation is superimposed upon the tops of the filter tubes, this oscillation being damped by the viscous effect of the surrounding gas and by friction.

The superimposition of the two oscillatory movements causes a rapid expansion and contraction of the tube and results in a jerky movement of the filter surfaces to readily dislodge dust accumulations on the latter.

The dust-dislodging action is of course coordinated with the simultaneous and common backflushing of the filter surfaces whereby a gas flow in a direction opposite the normal dust-collection flow serves to carry off the dust dislodged from the filter surface and allow it to accumulate in the bins therebelow from which the dust may be withdrawn.

The rocker drive for the filter tube carriers can consist of a linearly shiftable horizontal bar which is displaced transversely to the horizontal axes of a plurality of rockers which are transversely spaced apart and extend along their respective axes. The bars can be formed with the camming elements which can project laterally of the bars and each rocker can have an actuating arm or lever which can project into the path of one of these elements.

Because the actuating arms or levers can be relatively long, the force which must be applied to angularly oscillate the rocker is relatively small and hence energy consumption is minimized.

Any conventional reciprocating drive can be used and we prefer to employ a fluid-response drive device such as a hydraulic cylinder, i.e. a piston-and-cylinder arrangement.

Alternatively, the drive can be a continuous element, such as an endless chain driven in one direction only and provided with a plurality of camming elements, each of which engages the actuating arms of the rockers in succession. In this case, the spacing of the camming elements should be such as to allow the rockers to swing fully into their opposite extreme positions from that in which they were displaced by the camming elements, thereby ensuring a uniform rhythm of rocking motion. Naturally, the cadence of engagement of the camming element with each rocker on the slide actuator should also generate a uniform rocking movement of rhythm.

According to an aspect of the invention, the pivot axis of the rockers need not coincide with the longitudinal mediam axis, but may be parallel thereto and can lie about and below the median axis of the rocker. Such an arrangement allows a greater horizontal or lateral component to be imparted to the filter elements or their suspensions so that a significant shaking action is imparted in addition to the vertical oscillatory movement mentioned previously.

BRIEF DESCRIPTION OF THE DRAWING

The above and other objects, features and advantages of the present invention will become more readily apparent from the following description, reference being made to the accompanying drawing in which:

FIG. 2 is a perspective view of a filter assembly utilizing the principles of the system of FIG. 1;

SPECIFIC DESCRIPTION

Figure 1:
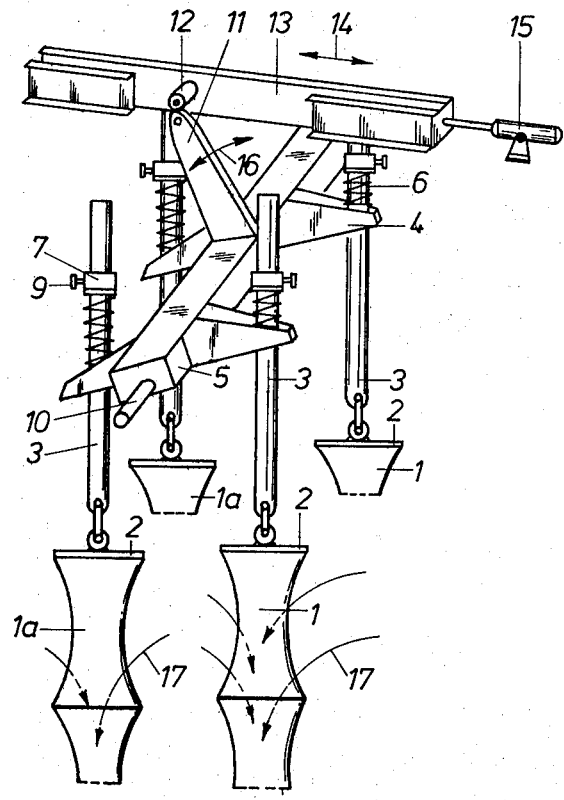
FIG. 1 is a diagrammatic perspective view of a portion of a filter assembly showing two rows of filters constituting a group provided with the filter expansion and contraction mechanism of the present invention.

FIG. 1 shows the principles of the present invention for a group of filters in the form of filter tubes 1 and 1a disposed in respective rows and which have tube covers 2 at their upper ends.

Rods 3 are pivotally connected to the covers 2 at the upper end of the tubes and are longitudinally shiftable in arms 4 which can be bifurcated to embrace the rods 3. The arms 4 project in opposite directions, mirror symmetrically with respect to a symmetry plane, which is vertical and disposed between the two rows of filter tubes, as outriggers from a common support 5 constituting with these arms, a rocker which is pivotal about an axis defined by the shaft 10.

The support or carrier 5 has the configuration of a beam and is provided with an upwardly extending actuating arm or lever 11.

The arms 4 can each be formed by two mutually parallel spaced-apart cheeks or plates which are connected at their free ends so that the rods 3 lies between the cheeks.

As can be seen from FIG. 1, the rods 3 are each provided with a ring 7 forming the upper seat for a spring 6, the ring being adjustable along the rod by a locking or set screw 9.

At their lower ends, the springs 6 bear against the arms 4. Any precompression of the spring 6 can be set by adjusting ring 7 in the rest position of the device.

As a result, the spring 6, the rods 3 and the filter 1 or 1a of each arm forms a damped vertically vibratile assembly whose natural frequency is determined by the total mass and the spring constant and whose damping effect is determined by the friction and the viscous drag upon the filter by the surrounding gas.

Figure 1A:
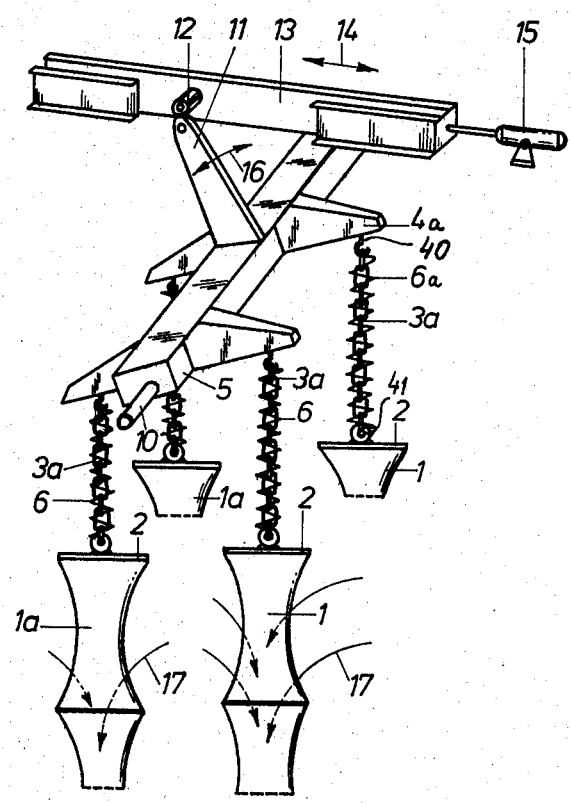
FIG. 1a is a view similar to FIG. 1 but representing a modification.

A similar vibratile system is provided in the embodiment of FIG. 1a wherein the arms 4a from the carrier 5 are provided with hooks 40 which engage the upper links of chains 3a which here perform the function of the vertically movable rods 3. At their lower ends, the chains 3a are articulated at 41 to the cover plates 2 of the filters 1 or 1a. The damping should be such that the vibration proceeds through at least one full cycle.

Each of the chains 3a can be surrounded by a coil spring 6a and, since the links of each chain are free to move relative to one another, the chain forms a vertically extendable and contractable member cooperating with the spring to provide a vertically vibratile system whose natural frequency is a function of the mass of the chain and filter system and the spring characteristic.

In each case, the filter carrier 5 is mounted on the shaft 10, one of which can project from each end of the carrier, upon the filter housing in trunnions or the like which have not been shown. Thus the rocker arms 4 can pivot about the respective horizontal axes as represented by the arrow 16. Various positions of the rockers have been shown in FIG. 2.

The actuating arm or lever 11 is disposed in a path of a camming member 12 shown as a pin projecting laterally from a slider 13 which can be reciprocated as represented by the doubleheaded arrow 14 by the cylinder 15 shown diagrammatically.

In the illustration of FIG. 1, the cam 12 has carried the arm 11 to its maximum counterclockwise position whereupon the arm, after it has been cleared by the cam, can rotate in the clockwise position.

This free pivotal action in the opposite direction permits the filter of the row which has previously been expanded to contract and the filter tubes of the opposite row to expand thereby dislodging dust. This can be seen from the change in the shape of the filter tube walls in FIG. 1.

Upon release of the lever 11 by the pin or roller 12, the compressed springs 6 urge the rocker in the clockwise sense and impart a vertical oscillation, to the individual filter assemblies which is imposed upon the expansion and contraction effects of the rocker, the damped oscillation serving to stretch and release the filter surfaces. During this oscillation, the filters may be backwashed with gas as represented by the arrows 17.

FIG. 2 shows the filter in greater detail and also illustrates how a number of rows of filters with respective rockers all operated by a single slider 13 can be provided.

The cover of the filter housing has been removed and only the plates of the individual filter have been shown.

In this embodiment, the slide 13 is shown to consist of a pair of channels 13a, 13b bridged by the shafts 12a whose rollers 12b are rotatable between the shaft to form the cams 12.

The channel 13b has been shown broken away in FIG. 2

The slider 13 can be guided in the filter housing between rollers 43 in a support 44.

As is also apparent from FIG. 2, the filter can comprise four pairs of rows of filter tubes in respective housing portions of sections 18 so that the group of filters in each housing section can be cleaned separately. In the embodiment shown the cams 12 are disposed to actuate the levers 11 of the rockers in succession and the lever of the second rocker from the right is in its fully displaced position.

Figure 4:
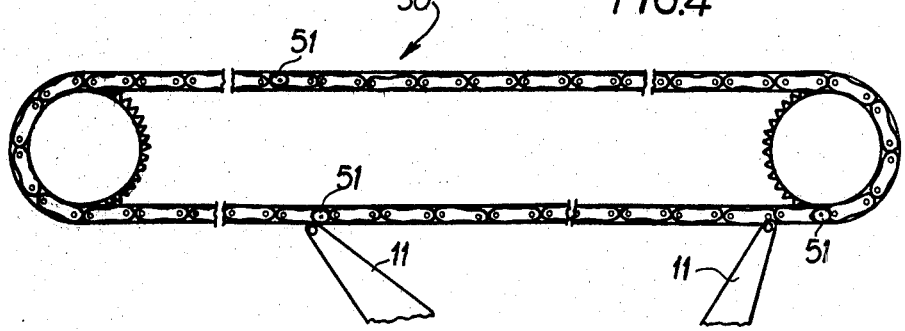
FIG. 4 is a diagram showing the use of a continuously driven chain for angularly displacing the rockers.

In the embodiment of FIG. 4, an endless chain 50 is shown to be provided with a plurality of cams 51 which engage the levers 11 of the rockers to swing these levers only in the counterclockwise sense, the spacing between the cams 51 being such that the rocker can swing fully in the opposite sense before the lever is again engaged by a cam.

Figure 3:
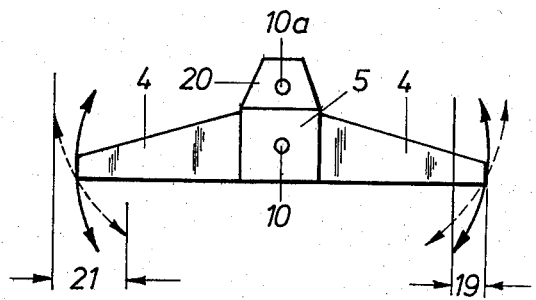
FIG. 3 is a diagram showing the effect of displacing the pivot point of the rocker.

Apart from the expansion and contraction movements of the filter tubes brought about by the pivotal motion of the rockers and the vertical vibrations, it is also possible to impart a lateral shaking movement as has been indicated in FIG. 3. When the axis is moved up to the position at 10a, e.g. by mounting the beam 5 on lugs 20, the lateral displacement is increased from the limited extent 19 to the greater extent at 21 in FIG. 3. Naturally, this increase in the lateral displacement does not depend upon whether the offset of the axis is upwardly or downwardly.

We claim:

1. A filter installation comprising:
   at least two rows of spaced-apart filter tubes;
   a rocker pivotal about a horizontal axis between said rows and having respective arms disposed above each of said filter tubes and assigned thereto;
   respective resilient oscillatory links connecting each of said arms with a respective filter tube whereby each resilient link forms a vibratile suspension with the respective filter tube, each of said links includes:
   a respective support member swingably connecting each of said filter tubes with a respective one of said arms and allowing relative longitudinal movement of the respective arm and tube, and
   a respective spring surrounding each of said support members; and
   means for angularly displacing said rocker about said axis to expand and contract said filter tubes to dislodge collected material therefrom.

2. The installation defined in claim 1 wherein said support members are respective rods pivotally connected to each of said filter tubes and longitudinally displaceable relative to the respective arm, each of said springs surrounding a respective rod and bearing against the respective arm and a seat on the respective rod.

3. The installation defined in claim 2, further comprising means for adjustably positioning each seat on the respective rod.

4. The installation defined in claim 1 wherein each of said support members is a respective chain connecting each of said filter tubes with the respective arm.

5. The installation defined in claim 1 wherein said rocker is formed with an actuating lever extending perpendicular to said axis and the means for angularly displacing said rocker includes a cam engageable with said lever and displaceable transversely to said axis.

6. The installation defined in claim 5 wherein the means for angularly displacing said rocker includes a slider shiftable horizontally, said cam being formed on said slider.

7. The installation defined in claim 6, further comprising a fluid-operated cylinder connected to said slider for displacing same.

8. The installation defined in claim 5 wherein said means for angularly displacing said rocker includes an endless chain provided with said cam.

9. The installation defined in claim 1 or claim 5 wherein said rocker has a beam lying between said rows and said axis is offset from said beam in a vertical median plane of symmetry between said arms and said filter tubes.

* * * * *

UNITED STATES PATENT AND TRADEMARK OFFICE
CERTIFICATE OF CORRECTION

PATENT NO. : 4,298,362

DATED : November 3, 1981

INVENTOR(S) : Walther Krull et al.

It is certified that error appears in the above-identified patent and that said Letters Patent is hereby corrected as shown below:

In the heading, left column, item [30], please correct the foreign-application priority date to read:

-- April 20, 1979 --.

Signed and Sealed this

Eighteenth Day of October 1983

[SEAL]

Attest:

Attesting Officer

GERALD J. MOSSINGHOFF

Commissioner of Patents and Trademarks